(12) United States Patent
MacKay et al.

(10) Patent No.: US 6,421,257 B2
(45) Date of Patent: Jul. 16, 2002

(54) POWER CONVERTER CONTROL LOOP

(75) Inventors: Stephen John MacKay, Swindon; Stephen Berry, Witney, both of (GB)

(73) Assignee: Oxford Magnet Technology Limited, Oxford (GB)

( * ) Notice: Subject to any disclaimer, the term of this patent is extended or adjusted under 35 U.S.C. 154(b) by 0 days.

(21) Appl. No.: 09/780,607

(22) Filed: Feb. 12, 2001

(30) Foreign Application Priority Data

Feb. 11, 2000 (GB) .............................................. 0003058
Sep. 13, 2000 (GB) .............................................. 0022367

(51) Int. Cl.⁷ .............................. H02M 1/12; G05F 1/40
(52) U.S. Cl. ......................................... 363/41; 323/282
(58) Field of Search .............................. 363/41, 40, 39, 363/37, 21.01, 97; 323/282, 284, 285, 222

(56) References Cited

U.S. PATENT DOCUMENTS

| 4,825,347 A | | 4/1989 | Guerrera ........................ 363/41 |
| 4,975,820 A | * | 12/1990 | Szepesi ..................... 363/21.17 |
| 5,192,906 A | * | 3/1993 | Nathan ........................ 323/284 |
| 5,245,526 A | * | 9/1993 | Balakrishnan ................ 363/97 |
| 5,920,475 A | | 7/1999 | Boylan et al. |
| 5,999,433 A | | 12/1999 | Hua, et al. |
| 6,009,000 A | | 12/1999 | Siri |
| 6,091,233 A | * | 7/2000 | Hwang et al. ............... 323/222 |

FOREIGN PATENT DOCUMENTS

| EP | 0260963 | 3/1988 |
| EP | 0415244 | 3/1991 |
| EP | 0918393 | 5/1999 |
| GB | 2125994 | 3/1984 |
| GB | 2156548 | 10/1985 |
| GB | 2212305 | 7/1989 |

* cited by examiner

*Primary Examiner*—Rajnikant B. Patel
(74) *Attorney, Agent, or Firm*—Crowell & Moring LLP

(57) ABSTRACT

An apparatus for and method of control of a switch (102) in an electrical power converter (100) using pulse width modulation to regulate output voltage (112) and current The method allows precise output voltage regulation to be achieved whilst accurately controlling the proportion of load-current supplied by multiple modules connected in parallel. A ramped waveform (408), consisting of a component representing the instantaneous current and a component representing the input voltage applied since the switch (102) switched on in the current PWM cycle, is compared with an error signal (406) to determine the width of each PWM pulse.

11 Claims, 5 Drawing Sheets

POWER CONVERTER CONTROL LOOP

The present invention relates to a power converter control loop. More particularly the invention relates to a method of control for electrical power supply units, each unit having a plurality of power converter modules. The method allows precise output voltage regulation to be achieved at the same time as accurately controlling the proportion of load current supplied by the power converter modules connected in parallel.

The method may be implemented in any electrical power converter unit using pulse width modulation (PWM to regulate output voltage or current and is suitable for any application where the outputs of multiple power converter modules are connected in parallel. A PWM signal controls the state of a semiconductor switch, for example, a power transistor, an insulated gate bipolar transistor, a metal-oxide-semiconductor field-effect transistor (MOSFET) or a gate turn-off thyristor.

Voltage feed-forward is a prior art method of PWM regulation for achieving an accurate output voltage. A ramped waveform is fed-forward : through a PWM comparator which in turn controls the width of each PWM pulse. Voltage feed-forward does not, however, permit current sharing of multiple modules.

Parallel connections are desirable for many reasons. Connecting multiple power converter modules in parallel increases the maximum output power beyond that available from a single module, provides redundancy in the event of failure of one or more modules and reduces costs by allowing the use of smaller, standard components.

Current mode control is a prior art method of PWM regulation for achieving accurate current control that enables multiple modules to be connected in parallel within a power converter unit. Current mode power converter units themselves may be set in parallel to one another.

A known drawback of current mode power conversion is the existence of instability when the ratio of PWM 'ON'-time to 'OFF'-time, the duty cycle, exceeds 50%. The accepted technique for stabilizing current mode control schemes is known as 'slope compensation' in which a compensating voltage signal is summed with a reference voltage signal used to generate the PWM signals. Nevertheless, slope compensation reduces open loop voltage accuracy (the voltage accuracy in the absence of feedback) and subsequently closed loop voltage accuracy (the voltage accuracy with feedback).

It is therefore an object of the invention to obviate or at least mitigate the aforementioned problems.

In accordance with the present invention, there is provided an apparatus for applying a pulse width modulated signal to a power supply unit, the apparatus including:

means for providing an input demand signal;

an error amplifier means for generating an error signal in accordance with an input demand signal;

a waveform generator means for generating a ramped voltage waveform;

an oscillator means for providing a clock signal to the ramped voltage waveform generator, a phase comparator means, for comparing the ramped voltage waveform with the error signal and generating the pulse width modulated signal.

Preferably, the ramped voltage waveform has a current feedback component and a voltage feed-forward component.

Advantageously, the phase comparator means generates the pulse width modulated signal in accordance with the clock signal, the pulse width modulated signal cycling between an 'ON' state and an 'OFF' state.

The onset of each 'ON' state may be arranged to coincide with the onset of each pulse in the clock signal.

The onset of each 'OFF' state is preferably controlled by the result of the comparison between the ramped voltage waveform with the error signal.

The waveform generator means preferably includes a capacitor and a voltage to current converter.

The input demand signal may be modified by a feedback correction signal.

In accordance with a firer aspect of the present invention, there is provided a method for generating a pulse width modulated signal which is regulates both output voltage and output current in a power converter, including the steps of:

a) providing an input demand signal;

b) generating an error signal in accordance with the input demand signal;

c) providing a clock signal;

d) generating a ramped voltage waveform in accordance with the clock signal;

e) comparing the ramped voltage waveform with the error signal; and f) generating the pulse width modulated signal in accordance with the result of the comparison step e).

The pulse width modulated signal generated in step f) is preferably generated in accordance with the clock signal, the pulse width modulated signal cycling between an 'NO' state and an 'OFF' state.

Step f) may further include arranging the onset of each 'NO' state to coincide with the onset of each pulse in the clock signal.

Advantageously, step f) also includes arranging the onset of each 'OFF' state to be controlled by the result of the comparison step f).

Preferably, step d) includes summing a current feedback component and a voltage feed-forward component Step b) may Her include modifying the input demand signal in accordance with a feedback correction signal.

The invention is particularly suitable for applications where a power-converter unit supplies highly inductive, capacitive or non-linear loads. The use of a simple error integrator control loop compensates for the phase shifts in tie output to input transfer functions which are inevitable at certain frequencies in a power supply having inductive and capacitive components. Power converters having only resistor loads are simpler to compensate for at higher frequencies since they introduce no phase shift Optimum phase margin and gain margin are thus achieved without the need for, or performance degradation introduced by, additional gain/phase shaping.

For a better understanding of the present invention, reference will now be made, by way of example only, to the accompanying drawings in which.

Figure 1:
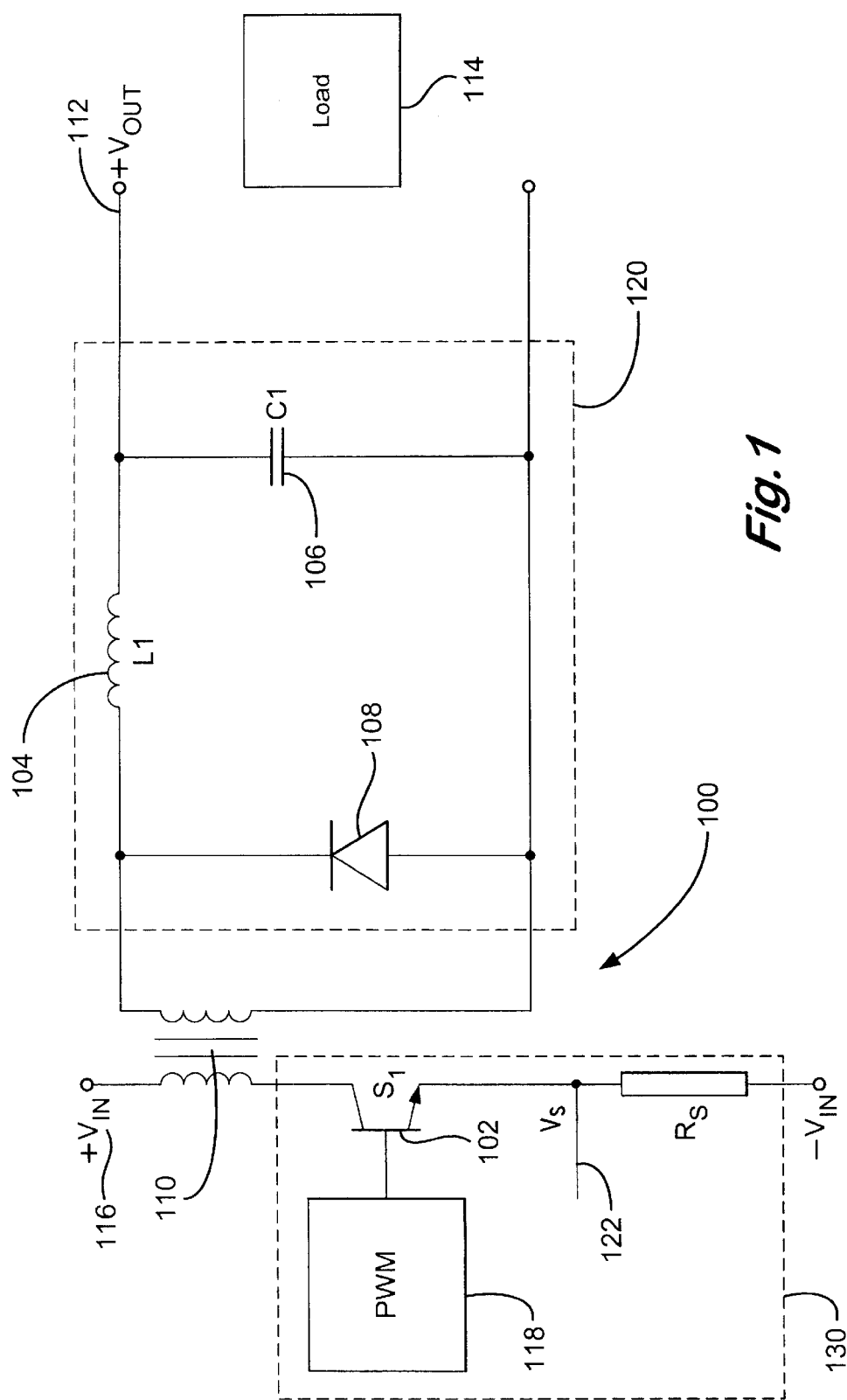
FIG. 1 shows a schematic circuit diagram of a buck converter.

A buck power converter 100 has the basic structure shown in FIG. 1. A series switch S1 102 chops the input voltage 116 under the control of a PWM signal 118 and applies the now pulsed input voltage across a transformer 110 to an averaging LC filter and rectifier 120 having an inductor L1 104 connected in series with a load 114 and a capacitor C1 106 connected in parallel with said load 114. The LC filter 120 is needed to filter variations in e output voltage caused by the PWM switching of the series switch 102 A diode 108 serves to complete a circuit in the 'OFF'- . time of the switch S1. It will be noted that such a converter will produce an output voltage which is always lower than the input voltage level.

Figure 2:
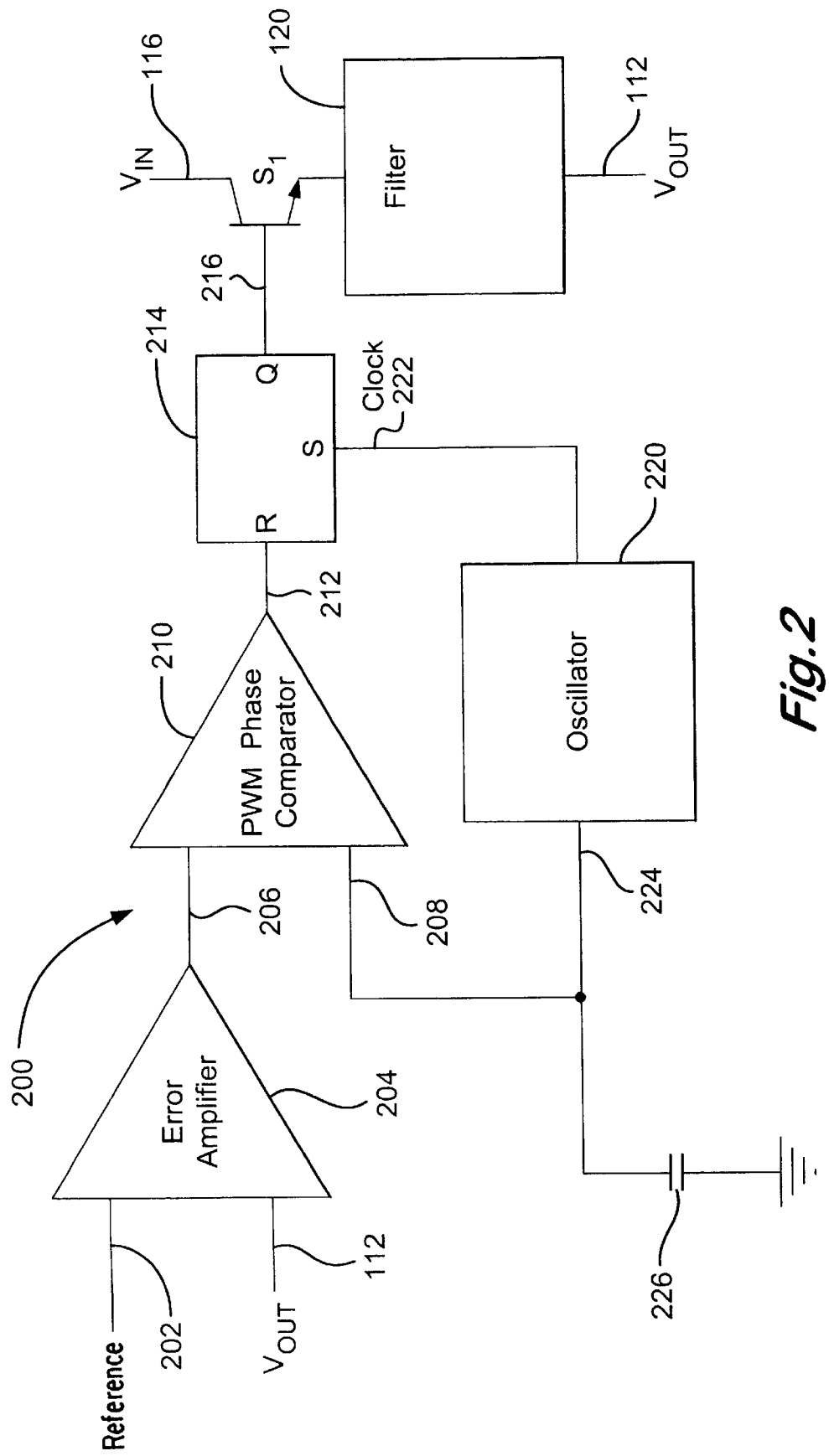
FIG. 2 shows a schematic circuit diagram of a voltage mode control apparatus.

Voltage mode control of a buck power converter is illustrated in FIG. 2. The control circuit 200, which generates the PWM signal supplied to the switch S1. includes an error amplifier 204, a PWM phase comparator 210, an oscillator 220 and a logic means 214. The error amplifier 204 generates a voltage error signal 206. The voltage error signal 206 is continually compared with a ramp waveform 208 by the PWM comparator 210. The PWM comparator 210 outputs a pulse 212 when the ramp waveform 208 has an amplitude equal to the voltage error signal 206. The output pulse 212 from the PWM comparator 210 corresponds to the end of the 'NO'-time of a latched signal 216 produced by the logic means 214. The onset of the 'NO'-time of the latched signal 216 coincides with a clock signal 222 produced by an oscillator 220. The latched signal 216 is applied to the switch S1 of the buck converter circuit 100. Thus the duration of the 'ON'-time corresponds to a portion of the cycle in which the rap waveform 208 is less than the voltage error signal 206.

The oscillator 220 also applies a pulse train 224 to a capacitor 226. In the absence of an oscillator pulse 224, the capacitor discharges and generates the r waveform 208. Voltage regulation is achieved by feeding back the output voltage signal $V_{OUT}$ 112 to the error amplifier 204. The output voltage signal 112 is compared with a reference voltage signal 202 by the error amplifier 204. Voltage feed forward regulation may additionally be achieved by controlling the current charging the capacitor 226 in accordance with the supply voltage. The result of the comparison is the error voltage signal 206.

Figure 3:
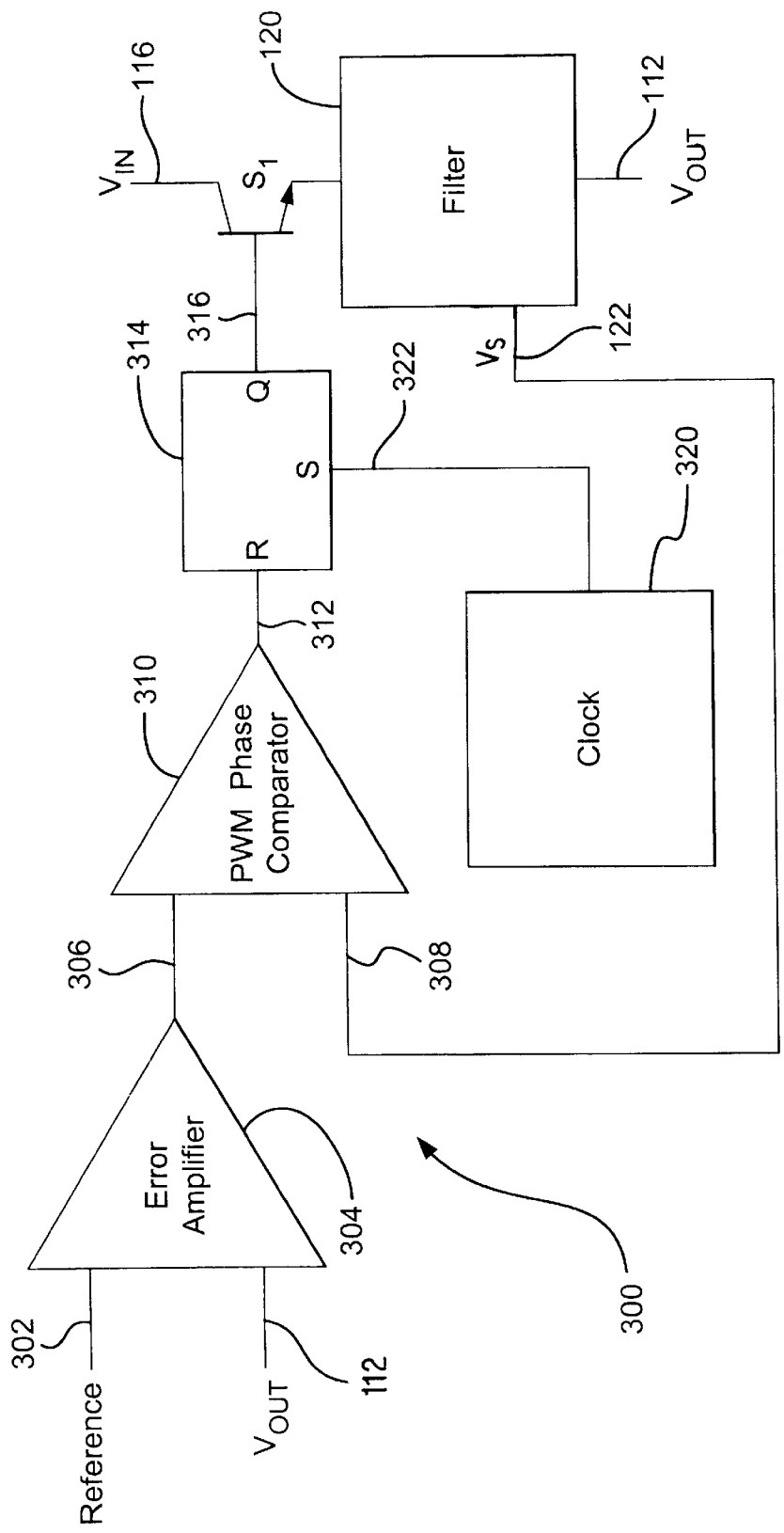
FIG. 3 shows a schematic circuit diagram of a current node control apparatus.

FIG. 3 illustrates current mode control of a buck power converter 100. Again, the control circuit 300 which generates the PWM signal applied to the switch S1 includes an error amplifier 304, a PWM phase comparator 310, an oscillator 320 and a logic means 314. These components are however connected in a distinct manner.

As in voltage mode, the error amplifier 304 generates a voltage error signal 306 and the voltage error signal 306 is continually compared with a signal derived from the output inductor current 308 by the PWM comparator 310. The PWM comparator 310 outputs a pulse 312 the instant the inductor current signal 308 is equal to the voltage error signal 306. The output 312 from the PWM comparator 310 corresponds to the end of the 'NO'-time of a latched signal 316 produced by the logic means 314 and applied to the'switch S1 of the buck converter circuit. The onset of the 'ON'-time of the latched signal 316 is under the control of a clock signal 322 produced by an oscillator 320.

As before, the output voltage signal 112 is compared with a reference voltage signal 302 by the error amplifier 304. The result of the comparison is the error voltage signal 306.

Crucial to current mode regulation is the feedback of a voltage signal 308 corresponding to inductor current detected at the switch S1 as the inductor signal $V_s$ 122. The slope of the inductor current signal 308 responds immediately to any line voltage changes. Thus regulation of the current flowing in the buck converter 100 is achieved by feedback of both output voltage 112 and the inductor current signal 308.

As mentioned above, slope compensation is required to stabilize the control loop for large ramps in duty cycle.

The power converter of the present invention combines features of both current and voltage modes.

Figure 4:
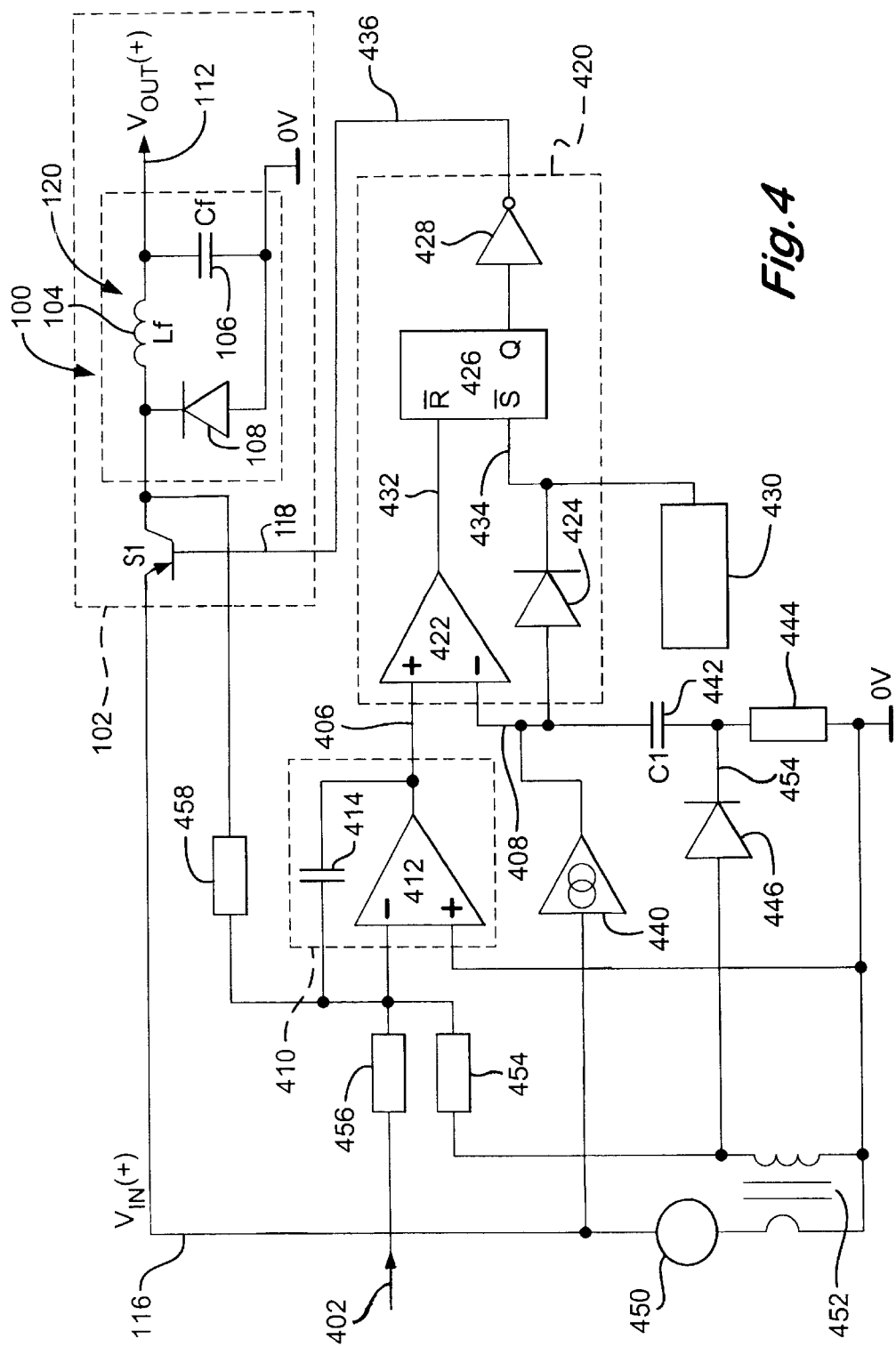
FIG. 4 shows a schematic diagram of a dual current-voltage regulating apparatus according to the present invention.

FIG. 4 shows a basic circuit layout according to the present invention. As before, a switch S1 102 is controlled by a PWM signal 118 and an LC averaging filter 120 removes any variations caused by the PWM signal 118.

It will be noted that, for simplicity, the switching power supply 100 shown being controlled by the PWM signal 118 is a buck regulator and not a converter. A buck converter as shown in FIG. 1 has an additional transformer between the control circuit and the filter circuit 120 but otherwise operates identically to a buck regulator. A practical buck converter often includes a means for converting electrical feedback signals into optical signals in the filter circuit 120 and corresponding means for converting the optical feedback signals into electrical signals for use by the control circuit. By addition of an optical stage in the feedback of signals to the control circuit, the isolation of the filter circuit 120 from the control circuit can be achieved.

In an operating control circuit, oscillator 430 generates a clock signal 434. The clock signal 434 is applied as a first input signal to a logic means 426 and, via a clock diode 424, to a ramp capacitor C1, 442. The logic means 426 also receives a second input signal 432 from the PWM s comparator 422 and acts as a latch for each PWM pulse. in FIG. 4, each PWM pulse is inverted at an inverter gate 428 and the resulting PWM pulse 436 is applied to the switch S1 102. The PWM comparator, the clock diode 424, the logic means 426 and the inverter gate 428 may all be provided upon a single integrated PWM circuit 420.

The input voltage for both the LC filter 120 and a voltage to current converter 440 is supplied by a voltage source 450. A current transformer 452, a resistor burden 444 and a diode 446 form a current loop 454. The current transformer 452 boosts the current across the current transformer burden 444 in the current loop 454.

Free-running oscillator pulses 434 start each PWM cycle and reset the voltage across the ramp capacitor C1, 442. The PWM 'NO'-time is terminated when a ramped waveform 408 $V_{RAMP}$ becomes equal to an error integrator output voltage 406 $V_E$.

The ramped waveform 408 is generated by superimposing a signal from the voltage to current converter 440 and the voltage across the ramp capacitor C1 442. $V_{RAMP}$ is thus a time-varying signal consisting of a component representing the instantaneous current $V_{R/sense}$ summed with a component representing the integral of $V_{IN}$ 116 from the start of each PWM cycle.

$$V_{RAMP}(t) = V_{R/sense} + 1/T \int_{XON} V_{IN}\, dt$$

The error amplifier output voltage 406 $V_E$ is generated in a similar manner to that in voltage or current mode. An input voltage demand signal 402 is input into an error integrator 410. The error integrator 410 comprises an amplifier 412 and a capacitor 414 in parallel. The output of the error integrator 410, the error integrator output voltage 406 $V_E$, is applied to one input of a PWM phase comparator 422.

The PWM phase comparator 422 compares the ramped waveform 408 $V_{RAMP}$ and the error integrator output voltage 406 $V_E$ thus controlling the end of the PWM 'NO'-time in each PWM cycle Typically, the input voltage demand signal 402 is varied by the user in a range from 0 to–5 V which corresponds to output voltage in the range 0 to 100%. The output voltage feedback signal 112 is attenuated to produce 5V at 100% output voltage. The current feedback signal 454 scaled to produce 1V at 100% fill-load current. The capacitor 414 of the error amplifier integrator 410 is chosen so that the integrator 410 has unity loop-gain at less than 25% of the PWM switching frequency.

With the error amplifier integrator output voltage 406 in the range 0 to 5V comprising: the current loop voltage in the range 0 to 1V; and voltage at capacitor C1, $V_{C1}$, in the range 0 to 4V. The error amplifier integrator output voltage 406 ramps down by 25%, i.e. 1.25V, during the 'ON'-time in each PWM cycle. The error amplifier integrator output amplitude at PWM frequency must be greater than 0.5 volts to provide tie 50% 'slope compensation' needed to ensure closed-loop stability of the 1V current mode proportion of $V_{RAMP}$ at duty cycles greater than 50%.

The oscillator low period is arranged to be long enough to allow the ramp capacitor C1 442 to fully discharge but short enough to avoid the need for additional circuitry at low duty cycles.

The present invention achieves both maximum voltage accuracy and current-sharing accuracy at all frequencies from DC up to 25% of switching frequency and without the need for any additional large or expensive power components. In essence, the lower the frequency of a signal passing across the error amplifier integrator 410, the greater the averaging effect of the integrator.

Figure 5:
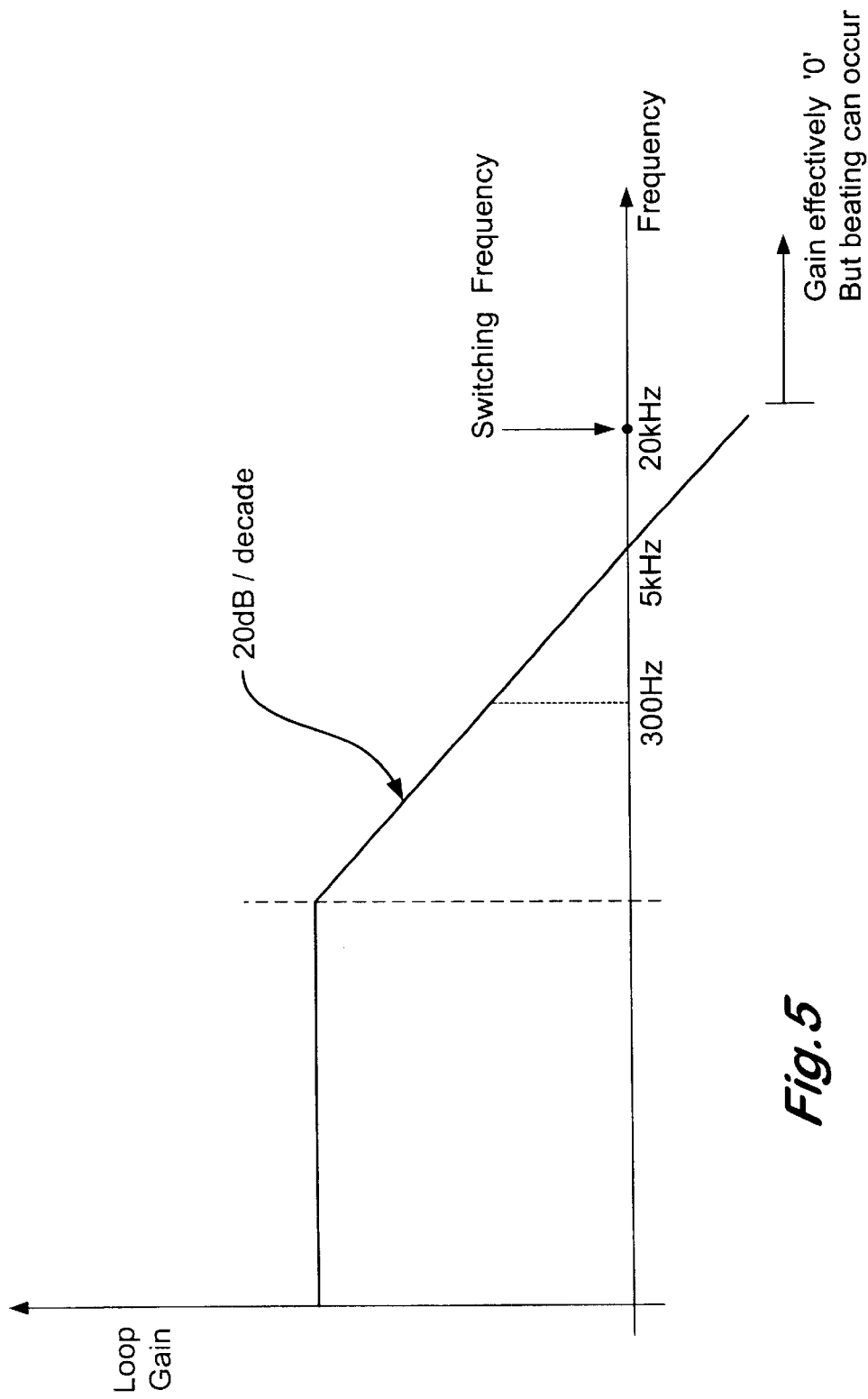
FIG. 5 shows a graphical representation of a typical loop gain frequency profile for the feedback loop in the present invention.

FIG. 5 illustrates the above effect: if the oscillator signal bad an inherent switching accuracy (at a switching frequency of 20 kHz) of ±1% and provided the loop gain is arranged to be unity at 25% of switching frequency, the switching accuracy at 5 kHz is also ±1% but at 500Hz the switching accuracy is up to ±0.1%: a real increase in accuracy is seen for lower frequency signals. It should be noted that while the gain effectively falls to zero for frequencies above the switching frequency, it is possible that two signals having frequencies above the switching frequency can still have an effect at lower frequencies. When the two signals have a small frequency difference between them they can interfere to cause low frequency beats.

It will be readily understood that the present invention operates with any type of buck-derived power converter or regulator circuit topology—including single-ended, push-pull, half bridge, fall-bridge (or H-bridge) and soft-switching configurations. Where necessary, the PWM signal may control the behavior of a plurality of switches.

Extra circuitry may be added to reset ramp capacitor C1 442 as soon as the phase-comparator terminates the PWM pulse and provide a minimum off-time.

It will be readily accepted that certain additional components will be necessary to realise a practical circuit, for example, a reset circuit for current transformer 452 core in implementations where a half-bridge is used, One advantage of the inventive device is that proprietary PWM integrated circuits may be used to integrate various circuit functions, A voltage feed-forward signal may be taken from the output voltage before the filter 120 in order to remove errors introduced by switch S1 as well as transformer (and when present, rectifier) losses Removal of these errors requires a Her high-speed differential amplifier, Additional closed loop feedback may be needed from $V_{OUT}$ 112 either locally or at the load.

What is claimed is:

1. An apparatus for applying a pulse width modulated signal to a power supply unit, the apparatus including:
   means for providing an input demand signal;
   an error amplifier means for generating an error signal in accordance with the input demand signal;
   a waveform generator means for generating a ramped voltage waveform;
   an oscillator means for providing a clock signal to the waveform generator means; and
   a phase comparator means for comparing the ramped voltage waveform with the error signal and generating the pulse width modulated signal;
   wherein the ramped voltage waveform comprises the sum of a current feedback component and a voltage feed-forward component.

2. An apparatus according to claim 1, wherein the phase comparator means generates the pulse width modulated signal in accordance with the clock signal, the pulse width modulated signal cycling between an 'ON', state and an 'OFF' state.

3. An apparatus according to claim 2, wherein the onset of each 'NO' state is arranged to coincide with the onset of each pulse in the clock signal.

4. An apparatus according to claim 3, wherein the onset of each 'OFF' state is controlled by the result of the comparison between the ramped voltage waveform with the error signal.

5. An apparatus according to claim 1, wherein the waveform generator means includes a capacitor and a voltage to current converter.

6. An apparatus according to claim 1, wherein the input demand signal is modified by a feedback correction signal.

7. A method for generating a pulse width modulated signal which regulates both output voltage and output current in a power converter, including the steps of:
   a) providing an input demand signal;
   b) generating an error signal in accordance with the input demand signal;
   c) providing a clock signal;
   d) generating a ramped voltage waveform in accordance with the clock signal;
   e) comparing the ramped voltage waveform with the error signal; and
   f) generating the pulse width modulated signal in accordance with the result of the comparison step e);
   wherein step d) includes summing a current feedback component and a voltage feed-forward component.

8. A method according to claim 7, wherein step b) further includes modifying the input demand signal in accordance with a feedback correction signal.

9. A method according to claim 7, wherein the pulse width modulated signal generated in step f) is generated in accordance with the clock signal, the pulse width modulated signal cycling between an 'ON' state and an 'OFF' state.

10. A method according to claim 9, wherein step f) further includes arranging the onset of each 'ON' state to coincide with the onset of each pulse ill the clock signal.

11. A method according to claim 10, wherein step f) fiber includes arranging the onset of each 'OFF' state to be controlled by the result of the comparison step f).

* * * * *